(12) United States Patent
Christ

(10) Patent No.: US 10,654,521 B2
(45) Date of Patent: May 19, 2020

(54) AXLE UNIT

(71) Applicant: SAF-HOLLAND GmbH, Bessenbach (DE)

(72) Inventor: Armin Christ, Bessenbach (DE)

(73) Assignee: SAF-HOLLAND GmbH, Bessenbach (DE)

( * ) Notice: Subject to any disclaimer, the term of this patent is extended or adjusted under 35 U.S.C. 154(b) by 119 days.

(21) Appl. No.: 15/561,776

(22) PCT Filed: Mar. 23, 2016

(86) PCT No.: PCT/EP2016/056461
§ 371 (c)(1),
(2) Date: Sep. 26, 2017

(87) PCT Pub. No.: WO2016/156169
PCT Pub. Date: Oct. 6, 2016

(65) Prior Publication Data
US 2018/0079450 A1 Mar. 22, 2018

(30) Foreign Application Priority Data
Mar. 27, 2015 (DE) .................. 10 2015 104 782

(51) Int. Cl.
*B62D 13/04* (2006.01)
*B62D 7/14* (2006.01)
*B60G 9/00* (2006.01)

(52) U.S. Cl.
CPC .............. *B62D 13/04* (2013.01); *B60G 9/00* (2013.01); *B60G 9/003* (2013.01); *B62D 7/144* (2013.01);
(Continued)

(58) Field of Classification Search
CPC ................ B62D 13/04; B60G 2200/44; B60G 2200/445
See application file for complete search history.

(56) References Cited

U.S. PATENT DOCUMENTS 1,273,059 A * 7/1918 Hild .......................... F16F 9/20
188/312
4,925,165 A 5/1990 Sketo
(Continued)

FOREIGN PATENT DOCUMENTS

CN 102427988 4/2012
CN 104349966 2/2015
(Continued)

OTHER PUBLICATIONS

European Patent Office; International Search Report, dated May 27, 2016.

*Primary Examiner* — Nicole T Verley
(74) *Attorney, Agent, or Firm* — Price Heneveld LLP

(57) ABSTRACT

The invention concerns an axle unit, in particular for use in utility vehicles with a hydraulic or compressed air system, comprising an axle tube and an actuation unit, wherein the axle tube has a receiving opening, wherein the actuation unit has a cylinder, a piston rod and a piston, wherein the piston divides a chamber of the actuation unit into a first chamber region and a second chamber region, wherein the piston rod is in engagement with the piston and is designed such that it can be brought into engagement with a leg of the axle unit in order to transmit a force to the leg, wherein the actuation unit is arranged in the receiving opening of the axle tube and is secured against moving transversely relative to a tube axis and at least in one direction parallel to the tube axis.

25 Claims, 6 Drawing Sheets

(52) U.S. Cl.
CPC ...... *B60G 2200/30* (2013.01); *B60G 2200/44* (2013.01); *B60G 2200/445* (2013.01); *B60G 2202/412* (2013.01); *B60G 2202/413* (2013.01); *B60G 2204/45* (2013.01); *B60G 2206/012* (2013.01); *B60G 2300/02* (2013.01); *B60G 2300/04* (2013.01); *B60G 2300/042* (2013.01)

(56) References Cited

U.S. PATENT DOCUMENTS

| | | | |
|---|---|---|---|
| 7,017,893 B1 * | 3/2006 | Vincenzo F. | B62K 25/04 |
| | | | 188/304 |
| 8,628,100 B2 * | 1/2014 | Buttner | B62D 7/144 |
| | | | 280/89 |
| 2009/0199603 A1 | 8/2009 | Baldauf et al. | |
| 2015/0321693 A1 * | 11/2015 | Buttner | B62D 7/144 |
| | | | 180/440 |
| 2018/0009475 A1 * | 1/2018 | Khoury | B62D 7/144 |

FOREIGN PATENT DOCUMENTS

| | | | |
|---|---|---|---|
| DE | 3008461 | 9/1980 | |
| DE | 19636803 C1 * | 11/1997 | ............... B60G 5/00 |
| DE | 202010006812 | 11/2010 | |
| DE | 102012025604 | 12/2013 | |
| DE | 102013112313 A1 * | 5/2015 | ............... B62D 5/12 |
| EP | 0747281 | 12/1996 | |
| EP | 1527982 | 5/2005 | |
| EP | 1556271 | 3/2009 | |
| EP | 3305627 B1 * | 5/2019 | |
| FR | 2335359 | 7/1977 | |
| FR | 2894553 | 6/2007 | |
| WO | 2004041620 | 5/2004 | |

* cited by examiner

AXLE UNIT

BACKGROUND OF THE INVENTION

The present invention concerns an axle unit for use in utility vehicles, in particular utility vehicles with a hydraulic or compressed air system.

Axle units for use in utility vehicles have been known in the prior art for a long time; in particular in towed utility vehicles or in multi-axle utility vehicles, it has proved advantageous to design at least one of the axles as a steered axle. One possibility of creating such a steered axle is to design the axle and wheel suspension as a trailing steered axle, wherein the rotation point of a leg on which a vehicle wheel is rotatably mounted is preferably arranged in front of the rotation axis of the vehicle wheel in the direction of travel. Steered axles configured in this way can be steered actively or passively, wherein in both cases, in particular on reversing of the utility vehicle, steering movements or deflections of the legs must be prevented. To this end, reversing locks have been used in the prior art, which however often take up considerable installation space and cause a high weight due to the solid structure required. Furthermore, it has been found that the additional return or blockade systems arranged in the region around the axle tube are particularly susceptible to the effect of foreign bodies thrown up during travel of the utility vehicle.

It is an object of the present invention to provide an axle unit which allows a reliable return and reversing lock for the legs of a steered axle of a utility vehicle, and furthermore requires little installation space and in particular contributes to reducing weight in the region of the running gear of a utility vehicle.

SUMMARY OF THE INVENTION

According to the invention, the axle unit comprises an axle tube and an actuation unit, wherein the axle tube has a receiving opening, wherein the actuation unit has a cylinder, a piston rod and a piston, wherein the piston divides a chamber of the actuation unit into a first chamber region and a second chamber region, wherein the piston rod is in engagement with the piston and is designed such that it can be brought into engagement with a leg of the axle unit in order to transmit an actuating force to the leg, wherein the actuation unit is arranged in the receiving opening of the axle tube and is secured against moving transversely relative to a tube axis and at least in one direction parallel to or along the tube axis. The axle tube is preferably the rigid axle of a utility vehicle which is normally formed as a hollow, cylindrically extending body. At its respective distal end regions, the axle tube has a fixing region for pivotable mounting of a leg, wherein the pivot point of the leg is preferably spaced from the tube axis or main extension direction of the axle tube. Furthermore, the axle tube has a receiving opening at least at one of its distal ends. The receiving opening of the axle tube preferably extends rotationally symmetrically about the tube axis. Preferably, an actuation unit can be inserted in this receiving opening and preferably fixed to the axle tube. To this end, the receiving opening of the axle tube may have an internal thread which may be brought into engagement with an external thread provided in regions on the outside of the actuation unit. Particularly preferably, the actuation unit is here mounted in the axle tube such that it prevents a movement of the actuation unit both transversely and along the tube axis. In a particularly simple embodiment, the actuation unit may thus be screwed into the axle tube. Preferably, the cylinder of the actuation unit may be formed by the axle tube itself. Thus the cylinder of the actuation unit may be configured integrally with the axle tube. The actuation unit has a piston and a piston rod, wherein the piston is fixed on the piston rod such that a movement of the piston along the tube axis also causes a movement of the piston rod along the tube axis. At its distal end facing away from the piston, the piston rod has a force transmission portion, by means of which a force or actuating force can be transmitted to the leg. The force transmission portion of the piston rod preferably has a rounded geometry, or for example a roller body, which reduces any occurrence of slip friction and surface wear on contact between the force transmission portion of the piston rod and the leg. The special feature of the present invention here is that the actuation unit is arranged inside the axle tube and hence is largely protected from environmental influences, such as for example foreign bodies and fluids thrown up during travel. Also, the actuation unit may be dimensioned sufficiently small for it to be able to be accommodated in existing axle units, wherein the outer diameter of the actuation unit need preferably only be slightly smaller than the inner diameter of an axle tube. Particularly preferably, the actuation unit, in particular preferably the cylinder of the actuation unit, has a collar which stops against the outside of the receiving opening of the axle tube and hence secures the actuation unit against displacement relative to the axle tube in the direction towards the middle of the axle tube. The force which the actuation unit, in particular the piston rod, transmits to the leg is preferably a force which brings the leg into a straight-ahead position of the utility vehicle. This straight-ahead position is characterized in that the rotation axes of the wheels of the utility vehicle stand parallel to the tube axis, and in particular are preferably perpendicular orthogonally to the vehicle longitudinal direction or direction of travel. The actuation unit is thus a return unit which is suitable for pivoting the legs, with the vehicle wheels arranged thereon, out of a deflected position about the pivot axis of the respective leg and bringing them into a straight-ahead position.

In a preferred embodiment, the actuation unit has a connecting portion for connection of a fluid line, wherein in operation of the actuation unit, a pressurized fluid can be introduced into one of the chamber regions (first or second chamber region). The connecting portion is preferably fitted with a thread or bayonet closure, or a similar fixing means for a line. This line is preferably connected to the hydraulic system or compressed air system of the utility vehicle. In a first preferred case, in which a pressurized fluid is introduced into the chamber region adjacent to the wall of the cylinder in which the connecting portion is provided, the connecting portion is simply a bore with corresponding sealing means (e.g. sealing ring) for connection of a fluid line. In the second, also preferred case, where the chamber region into which the pressurized fluid is to be introduced is the chamber region facing the direction of the axle middle, for example a corresponding line system is provided in the wall of the cylinder of the actuation unit, via which a pressurized fluid can be introduced into the corresponding chamber region and extracted therefrom again. Alternatively, preferably the axle tube may have a bore through which a connecting portion, let into the wall of the cylinder of the actuation unit, can be accessed. The disadvantage of making a cutout in the axle tube is that the strength of the axle tube is weakened in this region. Insofar as the axle tube has sufficiently high strength however, using a bore or opening made in the axle tube, a particularly simple and lightweight structure of the actuation unit is possible, since a connecting portion need merely be introduced from the side through the wall of the actuation unit or cylinder of the actuation unit.

Preferably, the leg is mounted on the axle tube so as to be pivotable about a pivot axis, wherein the pivot axis is spaced from the tube axis and stands transversely to the tube axis, wherein the leg is pivotable in a first pivot direction towards the piston rod and in a second pivot direction away from the piston rod, wherein the piston rod is configured to form a stop for the leg, at least in the first pivot direction. The leg is pivotably mounted on the axle tube preferably via a pivot pin. The pivot axis of the leg is preferably arranged perpendicular to a horizontal of the utility vehicle. Preferably, the piston rod is not attached to the leg by form or force fit, but is merely suitable for transmitting a force to the leg from a specifically extended position. In this way, while the piston rod is completely retracted into the actuation unit or cylinder of the actuation unit, the leg is freely pivotable independently of the piston rod. Only on activation of the actuation unit and extension of the piston rod does this transmit a force to the leg, preferably acting only in one direction, in order to bring this preferably into a straight-ahead position. In an alternative embodiment, the piston rod may also be mounted on the leg via an articulated joint element. Here, in particular preferably, forces can be transmitted between the leg and piston rod in two directions along the tube axis. The disadvantage of this embodiment is that because of the pivot movement of the leg, an articulated joint element is required, which entails additional weight and may be very complex. Particularly preferably, the actuation unit is configured only to guarantee the straight-ahead position of the wheels of the utility vehicle on failure of a hydraulic or compressed air system of the utility vehicle or during reversing. To this end, and in particular to save additional weight, the actuation unit is very compact and equipped with as few mutually movable parts as possible. In this sense, it is preferred that the actuation unit transmits a force to the leg via the piston rod only in one direction.

Preferably, the leg has a wheel axis, wherein a wheel of the utility vehicle can be mounted on the leg so as to be rotatable about said axis, wherein when the leg is in the straight-ahead position, the wheel axis is oriented parallel to the tube axis. Particularly preferably, the leg comprises a stub axle of conventional design on which a bearing arrangement, of preferably roller bearings, and the corresponding fixing nuts for tensioning the bearing arrangement are provided. The rotation axis of the vehicle wheel to be mounted rotatably on the bearing arrangement is here defined as the wheel axis of the leg.

In a further preferred embodiment, a second leg is mounted on the axle tube, opposite the first leg and pivotably about a second pivot axis, wherein the first leg and the second leg are connected together by a transmission element, wherein the transmission element transmits a pivot movement of the first or second leg to the respective other leg. Similarly to the first leg, the second leg is also mounted on the axle tube so as to be pivotable about a pivot axis, in the present case the second pivot axis. In other words, the transmission element is preferably a track rod. Furthermore, preferably, the transmission element may also be part of a steering cylinder and the corresponding steering rods, preferably equipped with articulated joints. An essential task of the transmission element is to transmit a pivot movement from one of the legs to the respective other leg. In this way, when the actuation unit can apply a force to one of the legs only in one direction, this pivot movement of the leg can be transmitted to the respective other leg via the transmission element, so that in an equilibrium state when both actuation units are fully retracted, both legs are brought into the straight-ahead position. In particular, preferably, opposite their pivot bearings on the first and second pivot axis respectively, the legs each have a corresponding bearing for attaching to the transmission element. It is understood that the transmission element is also mounted on the legs so as to be pivotable relative thereto. Corresponding pivot pins or steering arms are known from the prior art, which are oriented at a specific angle to the wheel axis of the leg and hence achieve a slight track difference between the right and left wheels when cornering. In this way, the driving behavior of the utility vehicle may also advantageously be designed with slight understeer on the trailing axle, in order in particular to reduce tire wear.

Particularly preferably, a second actuation unit can be mounted in a second receiving opening of the axle tube, wherein the second actuation unit is configured to apply a force to the second leg along the tube axis in the opposite direction to the force which is applied to the first leg by the first actuation unit. The two actuation units are therefore preferably oriented relative to each other mirror-symmetrically to a plane which runs orthogonally to the tube axis and in the axle middle, or coaxially to the tube axis. Each of the actuation units is preferably designed to exert a force on the respective leg, mounted pivotably on the axle tube, only in one direction. Together with the connection of the two legs via the transmission element, it is therefore possible, by targeted control of the actuation units, to achieve a specific position of the two legs relative to the tube axis. The advantage of this embodiment is that the two actuation units can be designed very simply, since each need be designed only to apply a force in one direction. The track rod may here be designed particularly simply and in particular preferably substantially lighter than the double-action cylinders known from the prior art, which provide the security and steering actuation of trailing axles in the solutions known in the prior art.

Preferably, in a fault state or on reversing of the utility vehicle, the piston rods of the actuation units protrude from the cylinders of the actuation units with a blocking length, wherein the legs are held in the straight-ahead position by the piston rods and the transmission element. In particular on a failure of the hydraulics of the utility vehicle, or the main steering cylinder which is normally responsible for setting the straight-ahead position during reversing of the utility vehicle, the main task of the actuation units is to secure or preferably create the straight-ahead position of the legs of the axle unit. To this end, the actuation units are designed to bring the piston rods into a specific extended position in which these protrude from the cylinders of the actuation units with the blocking length, and hence transmit a force to a leg or serve as a stop for this leg at a specific distance from the end of the axle tube. In the context of the present invention, it is particularly preferred if this state of the actuation units is set only when a fault occurs in the remaining steering system of the utility vehicle, or if—independently of a fault—the straight-ahead position of the legs and hence of the vehicle wheels should be set for reversing of the utility vehicle.

In a particularly preferred embodiment, the blocking length is the maximally extended length of the piston rod. In a further preferred embodiment, namely when the piston rod is designed to transmit a force to the respective leg in two directions along the tube axis, the blocking length is preferably half the maximally extended length of the piston rod. In this case, the piston rod is in particular designed to remain attached to the leg in both pivot directions, and in particular preferably to push or pull the leg back into the straight-ahead position from both maximum deflection positions. In this preferred embodiment, it is possible to arrange only one actuation unit on the axle tube, wherein the respective other leg can be brought into the corresponding pivot position provided by the actuation unit merely by the transmission element.

In a first preferred embodiment, the first chamber region is arranged on the side of the piston facing away from the piston rod, wherein an introduction of pressurized fluid into the first chamber region causes a movement of the piston and the piston rod along the tube axis, such that the piston rod comes into engagement with the leg and transmits an actuating force to the leg. In this preferred embodiment, the movement of the piston and piston rod is thus caused or initiated by the introduction of pressurized fluid into the first chamber region. For the function of this embodiment, it is therefore necessary that one of the compressed air or hydraulic systems of the utility vehicle still remains intact and can conduct an adequate quantity of fluid into the actuation unit with sufficient pressure. The advantage of this embodiment is that, by the use of compressed air or hydraulic fluid, relatively high forces can be generated on the piston and piston rod, so that even when the utility vehicle is stationary, it is possible to return the legs and the connected wheels from a deflected position into the straight-ahead position. In particular, the force which can be generated by the use of hydraulic fluid and compressed air is higher than, for example, a force generated by an elastically deformable return element. In modern utility vehicles, normally as well as the main compressed air or hydraulic circuit, a second hydraulic or compressed air circuit is provided, which may be used as a fallback. Thus, this embodiment is particularly suitable for utility vehicles in which there is already a redundancy of the hydraulic system or compressed air system. Furthermore, preferably, corresponding valve circuits may be provided via which, after introduction of a pressurized fluid into the first chamber region, the back-flow of fluid from this first chamber region can be prevented by means of a check valve. In this way, even if the pressure in the secondary compressed air or hydraulic system falls, the straight-ahead position of the legs can be guaranteed for a long period.

Furthermore, preferably, with the embodiment described above, the pressurized fluid can be stored in the storage tank which, even on failure of the entire hydraulic or compressed air system of the utility vehicle, provides sufficient fluid and pressure to move the piston rod(s) of the actuation unit(s) such that it/they protrude(s) out of the cylinder(s) with a blocking length. For this embodiment, the pressurized fluid may be a hydraulic fluid or preferably also compressed air. In both cases, the storage tank is designed to store a specific pressure from the main hydraulic or compressed air system of the utility vehicle, and on failure of the hydraulic or compressed air system, still deliver a specific quantity of pressurized fluid, sufficient for the actuation units, in order to conduct this into the actuation unit or units. The storage tank is here, in normal operation of the utility vehicle, preferably fed from the hydraulic or compressed air system of the utility vehicle, wherein a check valve prevents the pressurized fluid from simply flowing out of the storage tank on failure of the hydraulic or compressed air system of the utility vehicle. Furthermore, between the storage tank and the actuation unit, preferably another check valve is provided which prevents pressurized fluid from simply flowing back from the actuation unit into the storage tank when its pressure falls further. In this context, it has proved suitable to provide electronically switched valves, via which the fluid exchange between the actuation unit and the hydraulic or compressed air system of the utility vehicle can be controlled.

In an alternative embodiment, the first chamber region is arranged on the side of the piston facing away from the piston rod, wherein a return means is arranged in the first chamber region and held under pretension by the piston, wherein in normal operation of the actuation unit, the hydraulic or compressed air system of the utility vehicle provides pressurized fluid in the second chamber region, forcing the piston against the return means, wherein on a pressure fall in the second chamber region, the return means presses the piston with the piston rod against the leg. This embodiment is particularly suitable for cases in which the entire hydraulic or compressed air system of the utility vehicle fails and no tank for pressurized fluid is present. A simple return means which applies a force to the piston can therefore be regarded as a particularly good alternative for creating the straight-ahead position of the legs on failure of the hydraulic or compressed air system of the utility vehicle. Particularly preferably, in the above-mentioned embodiment too, a return means may also be provided with pressurized fluid, in addition to the pressurized fluid provided in the first chamber region, in order to create an additional safety level on failure of the hydraulic or compressed air system of the utility vehicle.

Particularly preferably, the return means comprises a metal spring element. Here preferably, a coil spring is arranged in the first chamber region, since this is particularly simple to produce and has a relatively low weight in respect to the return force it can apply. Alternatively, preferably, a row of cup springs may be arranged in the first chamber region. Cup springs are distinguished in that they can generate a particularly high return force, wherein by varying the number of cup springs, this force can also be provided over a large spring travel. The disadvantage is merely the higher weight of cup springs in comparison with a coil spring. Particularly preferably, two coil springs connected in parallel could be provided, wherein an outer one with a larger diameter and an inner one with a smaller diameter are particularly preferable.

In a further preferred embodiment, the piston rod is mounted on the leg such that it transmits a force to the leg in both directions along the tube axis. This embodiment is admittedly more complex in terms of the construction complexity of the interface between the piston rod and the leg than the embodiment in which the piston rod applies a force to the leg merely in one direction. The advantage however is that in this way, the piston rod is able to return the legs to the straight-ahead position from any deflection angle. In this way, it is possible to omit either the transmission element or a second actuation unit on the opposite side of the axle tube. Thus weight can be saved. In the context of the present invention however, this embodiment is not preferred if the actuation units are designed as very simple and lightweight systems acting only in one direction, which are used only in an emergency or in the case of a fault in the steering control system of the utility vehicle. The disadvantage with this embodiment is also that the actuation unit, and in particular the piston rod of the actuation unit, also executes all steering deflections of the leg and hence a higher wear is to be expected.

Furthermore, preferably, the leg has an application face which is formed such that on application of a force by the piston rod, substantially no force components occur transversely to the tube axis. In other words, the application face of the leg is configured such that substantially only force components running parallel to the tube axis act in the force transmission region between the piston rod and the leg. The term "substantially" in this case assumes that at least 85% of the force components act along or parallel to the tube axis. In this way, a bending of the piston rod can be avoided, and the piston rod can be dimensioned correspondingly thinner since it need only transmit tension and pressure forces and is not subjected to bending load. In addition, a better seal of the piston rod is achieved relative to the cylinder and corresponding slip seals on the cylinder of the actuation unit when the piston rod is only deflected slightly transversely to the tube axis. The application face of the leg here preferably has a curvature which, depending on the pivot position of the leg, has an intersection with the tube axis in which the tube axis stands substantially perpendicular to the application face or in which the tube axis intersects the application face substantially orthogonally.

Furthermore, preferably, the extension of the piston rod along the tube axis can be adjusted, wherein in the state fully retracted into the cylinder, the piston rod forms a steering deflection limit for the leg. As well as the main function of the actuation units to restore the straight-ahead position of the legs on failure of the steering control system of the utility vehicle, it is furthermore possible that, by an adjustability in the extension or length of the piston rod along the tube axis, the actuation unit functions as a stop for the legs. In particular, preferably, the piston rod for this may be configured so as to be telescopic, wherein a thread is provided via which the part provided rotatably to the rest of the piston rod can be screwed in or out of this, and locked with a corresponding lock nut. Thus, in a simple fashion, it is possible to adjust the maximum steering deflection of the legs and hence also of the vehicle wheels attached thereto, via the piston rod and prevent the wheels from coming into contact with parts of the chassis of the utility vehicle and being damaged or causing damage.

BRIEF DESCRIPTION OF THE DRAWINGS

Further advantages and features of the present invention arise from the description below with reference to the attached figures. It is understood that individual features depicted and described in the selected embodiments may also be used in other embodiments, unless this is explicitly excluded or prohibited for technical reasons. The drawings show.

DETAILED DESCRIPTION OF THE PREFERRED EMBODIMENTS

Figure 1:
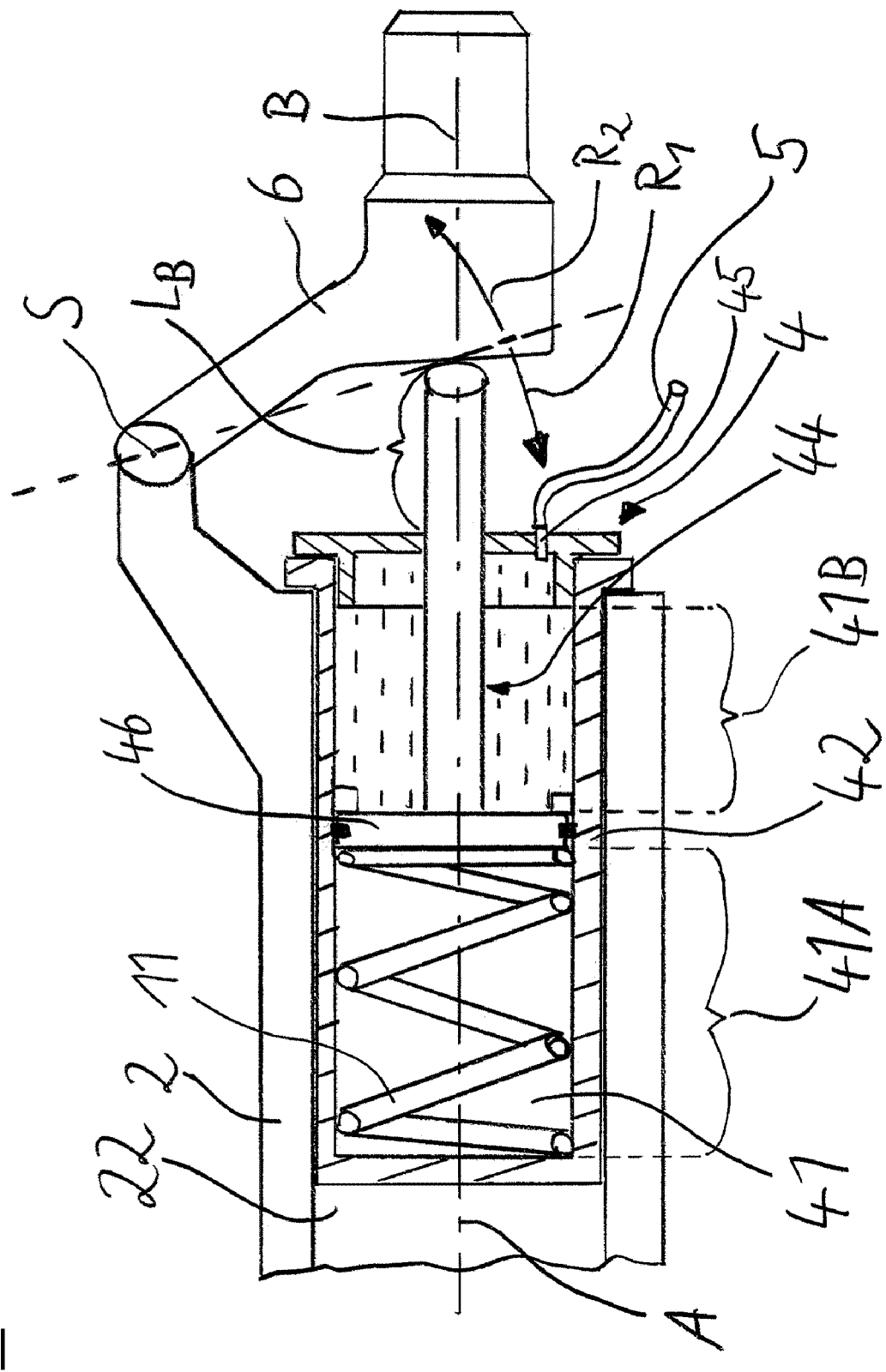
FIG. 1 is a partial sectional view of a first preferred embodiment of the axle unit according to the invention.

The actuation unit 4 shown in FIG. 1 is inserted in a receiving opening 22 of an axle tube 2, and rests on the axle tube 2 via a collar provided on the outside of the axle tube. The actuation unit 4 and the receiving opening 22 of the axle tube 2 are formed so as to be preferably substantially rotationally symmetrical about a rotation axis A. Only the return element 11 provided in the actuation unit 4, and the connecting portion 45 provided in the cover of the actuation unit 4, are not rotationally symmetrical about the tube axis but deviate from this rotational symmetry. The actuation unit 4 has a piston 46 which divides the chamber 41 of the actuation unit 4 into a first chamber region 41A and a second chamber region 41B. The chamber 41 of the actuation unit 4 is preferably the substantially cylindrical cutout in the interior of the cylinder 42 of the actuation unit 4. It is also evident that the piston 46 has sealing elements, such as for example peripheral sealing rings, which ensure a fluid tightness between the first chamber region 41A and the second chamber region 41B. A piston rod 44 is attached to the piston 46 which protrudes from the cylinder 42 of the actuation unit 4 and, with its distal end facing away from the piston 46, is configured to apply a force to a leg 6 of the axle unit. The leg 6 is mounted pivotably about a pivot axis S on a corresponding geometry of the axle tube 2. The piston rod 44 here constitutes a limitation for a pivot movement of the leg 6 about the pivot axis S in a first pivot direction $R_1$. In the embodiment shown in FIG. 1, the leg 6 is freely pivotable relative to the piston rod 44 in a second pivot direction $R_2$. In other words, the piston rod 44 transmits to the leg 6 a force acting only towards the right in the figure. FIG. 1 shows the straight-ahead position of the leg 6, in which a wheel axis B is oriented substantially parallel to the tube axis A of the axle tube 2 and the actuation unit 4. In this straight-ahead position of the leg 6, a vehicle wheel of the utility vehicle mounted rotatably about the wheel axis B preferably travels precisely straight ahead relative to the chassis or main travel direction of the entire utility vehicle. In the embodiment shown in FIG. 1, it is not shown that an engagement region for a transmission element 8 (not shown) is also provided on the leg 6, which is required in particular if the piston rod 44 is configured only to transmit a force in one direction along the tube axis A. Preferably a connecting portion 45 is created in the cover of the cylinder 42 to which a fluid line 5 can be connected and secured, via which a pressurized fluid can be introduced into the second chamber region 41B. As long as the hydraulic or compressed air system of the utility vehicle functions faultlessly, the second chamber region 41B is thus supplied with pressurized fluid, whereby the piston 46 moves to the left in the figure, and the return means 11 arranged in the first chamber region 41A is set under pretension and brings the piston rod 44 out of engagement with the leg 6. Only on failure of the compressed air system or hydraulics of the utility vehicle does the pressure in the second chamber region 41B fall so far that the return force of the return means 11 overcomes the fluid pressure in the second chamber region 41B, and moves the piston 46 to the right in the figure such that the piston rod 44 can come into engagement with the leg 6. In particular, preferably, in the state in which it secures the straight-ahead position of the leg 6, the piston rod 44 protrudes from the cylinder 42 or the cover of the cylinder 42 with a blocking length $L_B$, wherein in the present example, a stop is provided on the inner wall of the cylinder 42 which prevents the piston 46 and piston rod 44 from moving further to the right in the figure. Only after hydraulic fluid is again introduced via the fluid line into the second chamber region 41B, and the piston 46 together with the piston rod 44 is again moved to the left in the figure, can the leg 6 be moved back in the first pivot direction $R_1$.

Figure 2:
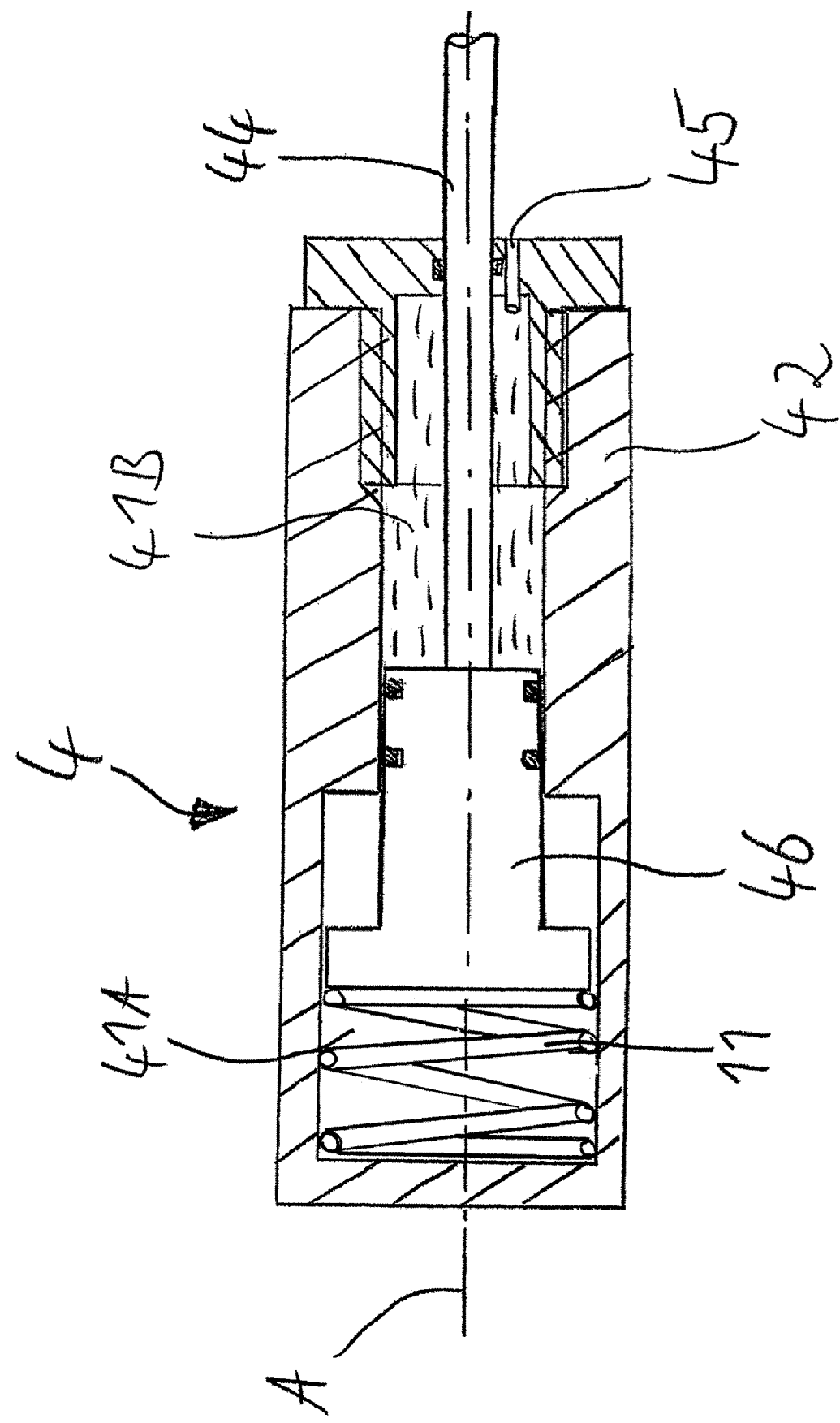
FIG. 2 is a sectional view of a preferred embodiment of an actuation unit according to the invention.

FIG. 2 shows an embodiment of the actuation unit 4 which differs from the embodiment shown in FIG. 1 only by the special design of the inner wall of the cylinder 42 and piston 46. Particularly preferably, the face of the piston 46 facing the second chamber region 41B is designed smaller than the face facing the first chamber region 41A. In this way, a particularly strong and hence voluminous return element 11 can be arranged in the first chamber region 41A, which can generate a force of similar level to that of the pressurized fluid supplied to the second chamber region 41B. The embodiment shown in FIG. 2 is therefore particularly suitable for a degree of over-dimensioning of the return force which can be applied by the return means 11 against the compressed air or hydraulic system of the utility vehicle, whereby in particular the return means is preferably not used in the region of its maximum compression and hence its service life is longer.

Figure 3:
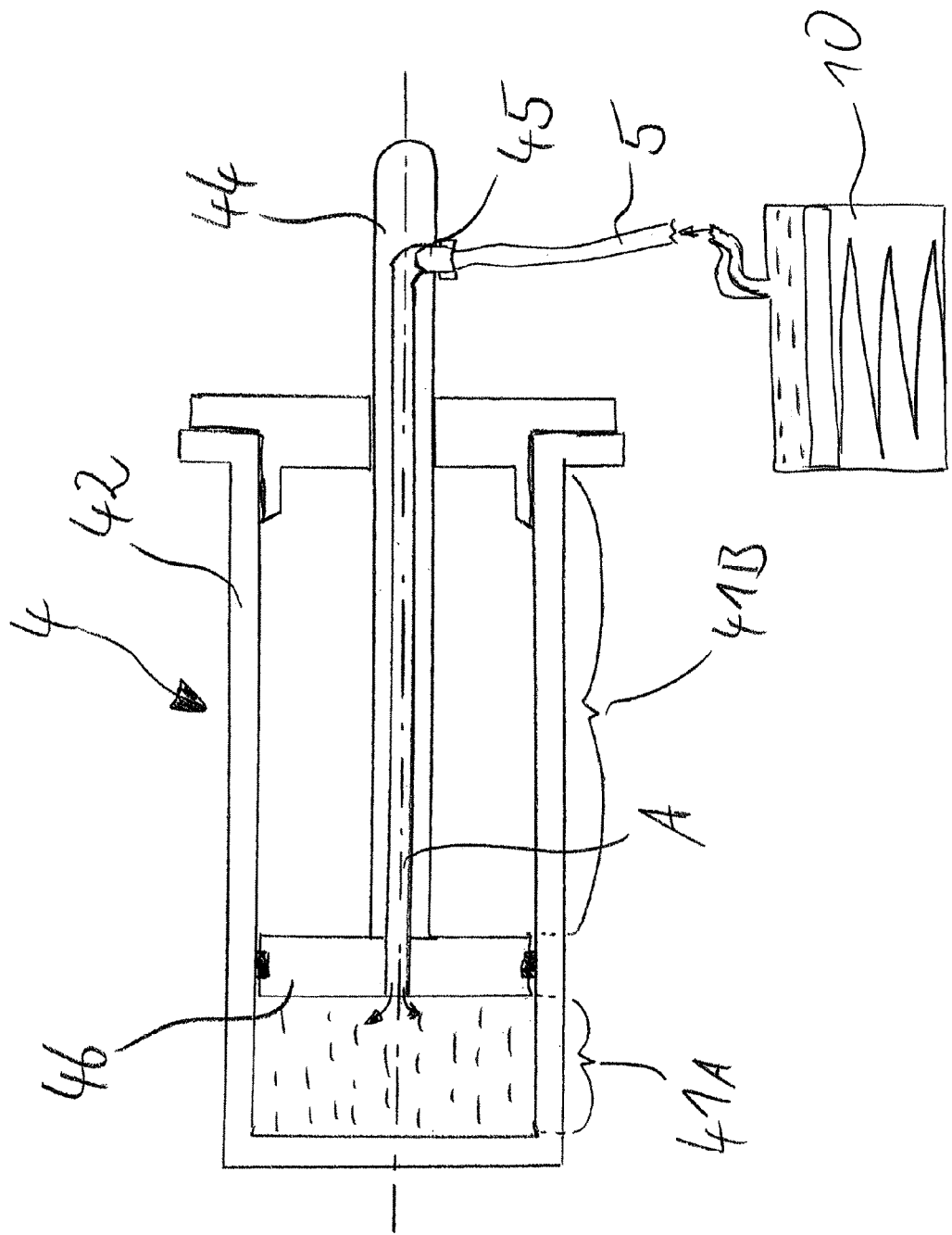
FIG. 3 is a further partial sectional view of a preferred embodiment of an actuation unit according to the invention.

In the alternative embodiment of the actuation unit 4 shown in FIG. 3, instead of the return element 11 in the first chamber region 41A, a pressurized fluid is introduced into the first chamber region 41A which moves the piston 46 and piston rod 44 in the direction of the leg 6, 7. Furthermore, preferably the pressurized introduction of the fluid is guaranteed via a fluid line 5 and a connecting portion 45 provided on or in the piston rod 44. In this way, it is possible to provide hydraulic fluid or compressed air to the first chamber region 41A from the outside, i.e. in particular preferably from outside the axle tube 2, in particular without having to make a bore in the axle tube 2 or in the cylinder wall 42. In this embodiment, preferably a storage tank 10 is provided to supply the first chamber region 41A with pressurized fluid, which tank offers the possibility of conducting an adequate quantity of pressurized fluid with sufficient pressure into the first chamber region 41A even on failure of the hydraulic system or compressed air system of the utility vehicle. A return means, which presses the pressurized fluid into the fluid line 5, is shown diagrammatically in the storage tank 10.

Figure 4:
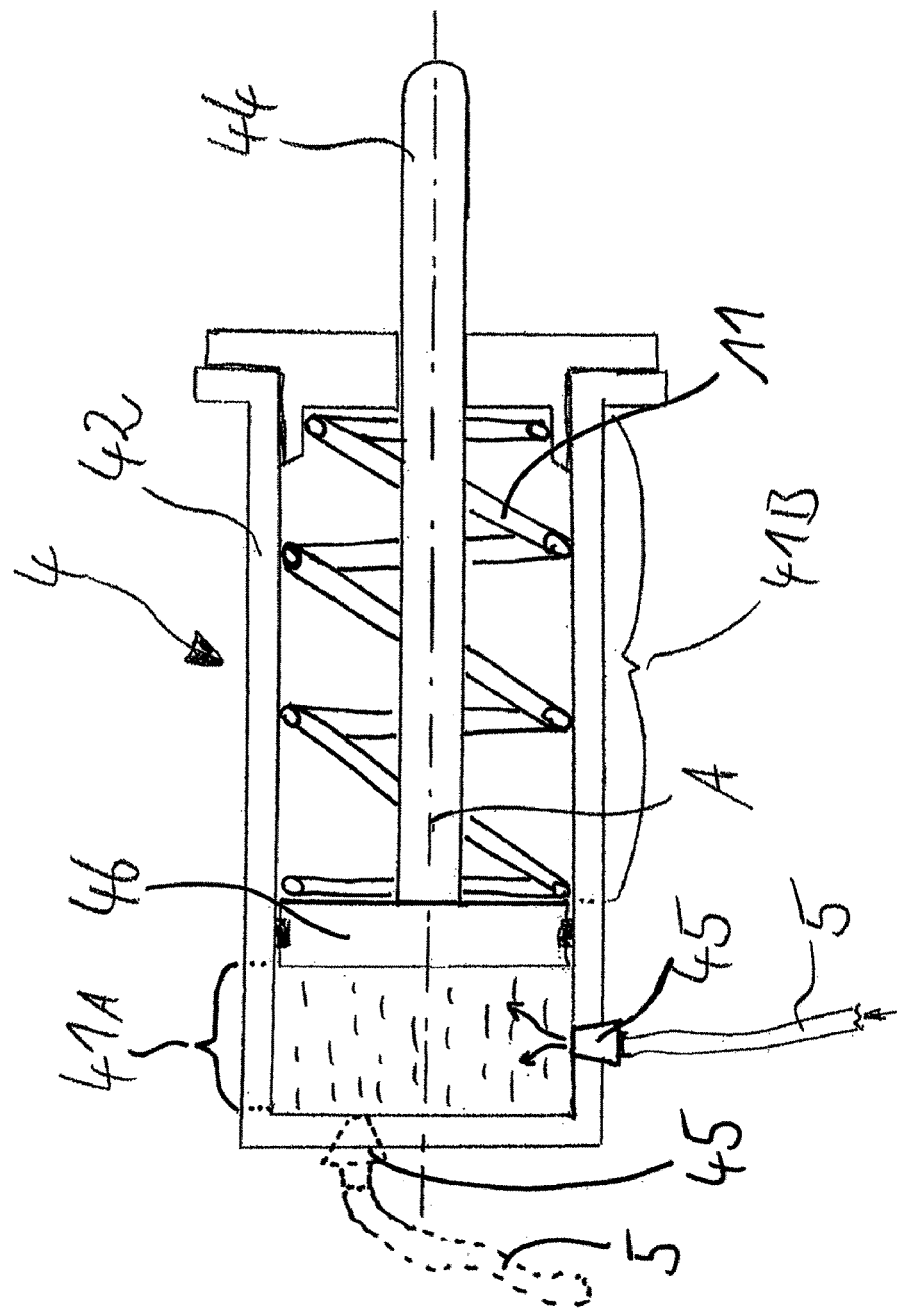
FIG. 4 is a further partial sectional view of a preferred embodiment of an actuation unit according to the invention.

FIG. 4 shows an alternative embodiment of the actuation unit 4 in which, in contrast to the embodiment shown in FIG. 3, the fluid line 5 is connected to the cylinder 42. The connecting portion 45 may be arranged on the side of the cylinder 42, wherein in this embodiment variant, a bore is also required in the axle tube 2. Alternatively, preferably, the connecting portion 45 may also be arranged on the end face of the cylinder 42 facing the middle of the axle tube 2 (shown in dotted lines). The advantage here is that no bore need be made in the axle tube 2, at least not in the receiving region of the actuation unit 4. Furthermore, preferably, a return means 11 in the form of a coil spring is arranged on the side of the piston 46 opposite the fluid, which moves the piston 46 and piston rod 44 into a position in which the piston rod 44 does not aim to bring the legs 6, 7 into the straight-ahead position. This proves advantageous in particular during fault-free operation of the axle unit, since pivot movements of the wheels can be performed without the intervention of the actuation unit 4. In the embodiment shown in FIG. 4, the fluid line 5 can also be connected to a storage tank 10.

Figure 5:
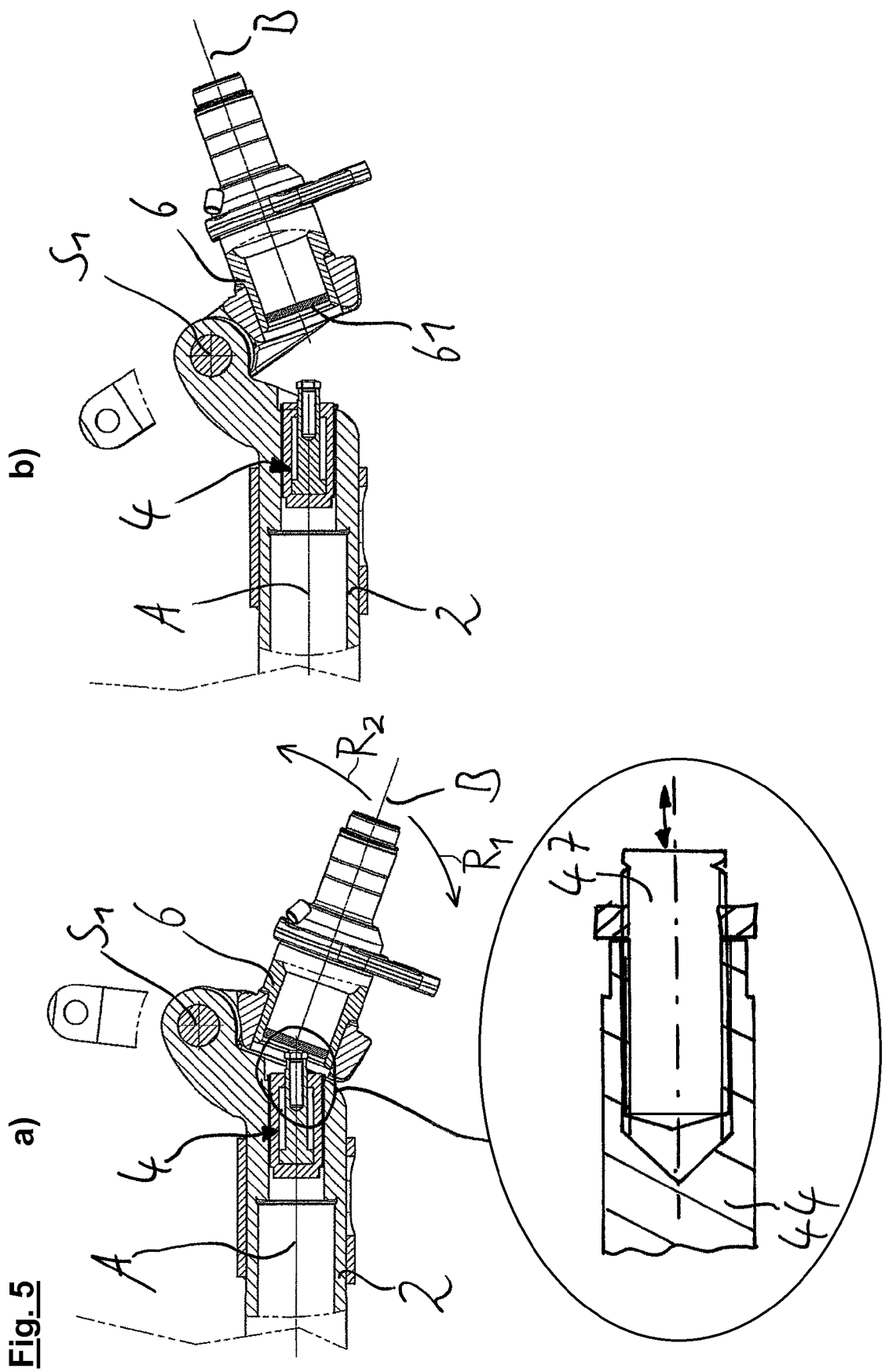
FIG. 5 is a view of a preferred embodiment of the axle unit according to the invention.

FIG. 5 shows various pivot positions of the first leg 6 relative to the axle tube 2 and to the tube axis A. In the depiction shown on the left of FIG. 5a), the leg 6 is pivoted to a maximum in the first direction $R_1$ (see also FIG. 1). The actuation unit 4 is configured to support the leg 6 at its application face 61 so that a collision of the leg 6 with the axle tube 2 or other chassis components is avoided. The enlarged view of FIG. 5a) shows an adjustment element 47, preferably provided on the piston rod 44. The adjustment element 47 is preferably formed as a screw bolt and can be fixed in the set position in the tube axis A by a lock nut. Via the adjustment element 47, the length of the piston rod 44 may therefore be changed, whereby for the same position of the piston 46, the leg 6 can be given a smaller or a greater pivot angle in the first pivot direction $R_1$ before the application face 61 meets the adjustment element 47 of the piston rod 44. In other words, the adjustment element 47 serves to limit the maximum steering deflection of the leg 6 in the first pivot direction $R_1$. FIG. 5b) shows that the leg 6 is not supported by the piston element 44 on a pivot movement in the second pivot direction $R_2$.

Figure 6:
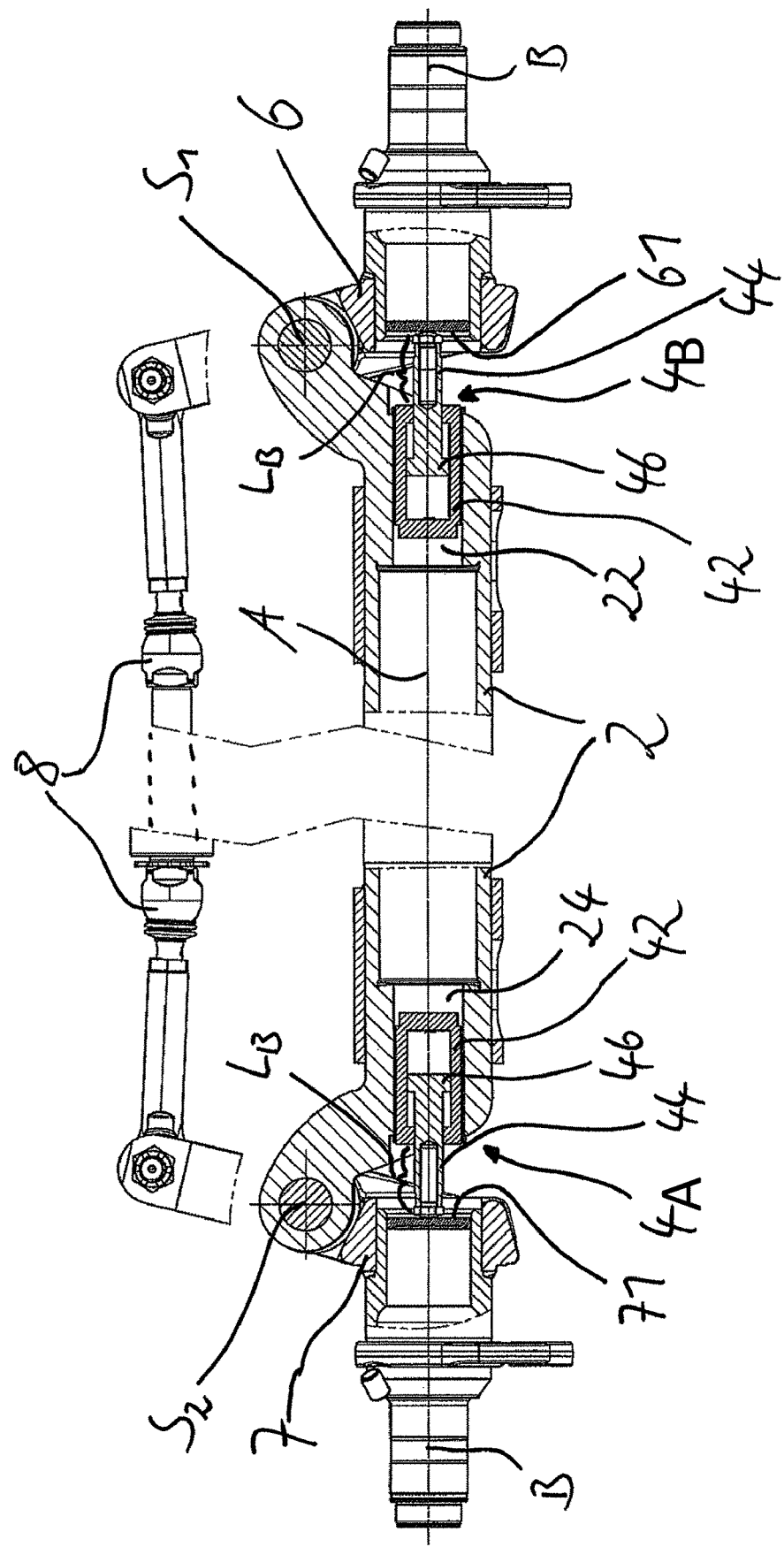
FIG. 6 is a further view of a preferred embodiment of the axle unit according to the invention.

FIG. 6 shows an axle unit with two legs 6, 7 in the manner of the leg 6 shown in the preceding figures, and two actuation units 4A, 4B arranged mirror-symmetrically to each other on the axle tube 2. FIG. 6 shows the position of the pistons 46 and piston rods 44 relative to the cylinders 42 in which the piston rods 44 engage on the respective application face 61, 71 in order to bring the legs 6, 7 into the straight-ahead position or hold them there. The piston rods 44 thus protrude from the cylinders 42 with their blocking length LB. A support element 8 is connected to both legs 6, 7, which transmits the pivot movement of the one leg 6, 7 to the respective other leg 6, 7. Preferably, the wheel axes B are parallel to the tube axis A in the straight-ahead position of the legs 6, 7.

LIST OF REFERENCE SIGNS

2—Axle tube
4—Actuation unit
5—Fluid line
6—(First) leg
7—Second leg
8—Transmission element
10—Storage tank
11—Return means
22—(First) receiving opening
24—Second receiving opening
41—Chamber
41A— First chamber region
41B— Second chamber region
42—Cylinder
44—Piston rod
45—Connecting portion
46—Piston
47—Adjusting element
61—(First) application face
71—Second application face
A—Tube axis
B—Wheel axis
$L_B$—Blocking length
$R_1/R_2$—First/second pivot direction
S—Pivot axis
$S_1/S_2$—First/second pivot axis

The invention claimed is:

1. An axle unit for use in utility vehicles with at least one of a hydraulic and a compressed air system, comprising:
   an axle tube; and
   an actuation unit;
   wherein the axle tube has a receiving opening;
   wherein the actuation unit has a cylinder, a piston rod and a piston;
   wherein the piston divides a chamber of the actuation unit into a first chamber region and a second chamber region;

wherein the piston rod is in engagement with the piston and is configured such that the piston rod can be brought into engagement with a leg of the axle unit to transmit a force to the leg; and wherein the actuation unit is arranged in the receiving opening of the axle tube and is secured against moving transversely relative to a tube axis and at least in one direction along the tube axis.

2. The axle unit as claimed in claim 1, wherein the actuation unit has a connecting portion for connection of a fluid line, and wherein a pressurized fluid is introduced into one of the chamber regions during operation of the actuation unit.

3. The axle unit as claimed in claim 1, wherein the leg has a wheel axis, wherein a wheel of the utility vehicle is configured to be mounted on the leg so as to be rotatable about the wheel axis, and wherein the wheel axis is parallel to or co-linear with the tube axis when the leg is in the straight-ahead position.

4. The axle unit as claimed in claim 3, wherein a second actuation unit has a cylinder, a piston rod and a piston, wherein in a fault state or on reversing of the utility vehicle, the piston rods of the actuation units protrude from the cylinders of the actuation units with a blocking length, and wherein the legs are held in the straight-ahead position by the piston rods and the transmission element.

5. The axle unit as claimed in claim 1, wherein a second leg is mounted on the axle tube opposite the first leg and is pivotably about a second pivot axis, wherein the first leg and the second leg are connected together by a transmission element, and wherein the transmission element transmits a pivot movement of at least one of the first leg and the second leg to the other of the at least one of the first leg and the second leg.

6. The axle unit as claimed in claim 1, wherein the first chamber region is arranged on the side of the piston facing away from the piston rod, and wherein the introduction of pressurized fluid into the first chamber region causes a movement of the piston and the piston rod along the tube axis such that the piston rod comes into engagement with the leg and transmits an actuating force to the leg.

7. The axle unit as claimed in claim 6, wherein the pressurized fluid is stored in the storage tank which, even on failure of the hydraulic or compressed air system of the utility vehicle, provides sufficient fluid and pressure to move the piston rod of the actuation unit such that the piston rod protrude out of the cylinders with a blocking length.

8. The axle unit as claimed claim 1, wherein the first chamber region is arranged on the side of the piston facing away from the piston rod, wherein a return member is arranged in the first chamber region and held under pretension by the piston, wherein in normal operation of the actuation unit, the at least one of the hydraulic system and the compressed air system of the utility vehicle provides pressurized fluid in the second chamber region, forcing the piston against the return member, and wherein on a pressure fall in the second chamber region, the return member presses the piston with the piston rod against the leg.

9. The axle unit as claimed in claim 8, wherein the return member comprises a metal spring element.

10. The axle unit as claimed in claim 1, wherein the piston rod is mounted on the leg such that the piston rod transmits a force to the leg in both directions along the tube axis.

11. The axle unit as claimed in claim 1, wherein the extension of the piston rod along the tube axis can be adjusted, and wherein in the state fully retracted into the cylinder, the piston rod is configured to limit a steering deflection for the leg.

12. An axle unit for use in utility vehicles with at least one of a hydraulic and a compressed air system, comprising:
an axle tube; and
an actuation unit;
wherein the axle tube has a receiving opening;
wherein the actuation unit has a cylinder, a piston rod and a piston;
wherein the piston divides a chamber of the actuation unit into a first chamber region and a second chamber region;
wherein the piston rod is in engagement with the piston and is configured such that the piston rod can be brought into engagement with a leg of the axle unit to transmit a force to the leg;
wherein the actuation unit is arranged in the receiving opening of the axle tube and is secured against moving transversely relative to a tube axis and at least in one direction along the tube axis; and
wherein the leg is mounted on the axle tube so as to be pivotable about a pivot axis, wherein the pivot axis is spaced from the tube axis and stands transversely to the tube axis, wherein the leg is pivotable in a first pivot direction towards the piston rod and in a second pivot direction away from the piston rod, and wherein the piston rod is configured to form a stop for the leg at least in the first pivot direction.

13. The axle unit as claimed in claim 12, wherein the leg has a wheel axis, wherein a wheel of the utility vehicle is configured to be mounted on the leg so as to be rotatable about the wheel axis, and wherein the wheel axis is parallel to or co-linear with the tube axis when the leg is in the straight-ahead position.

14. The axle unit as claimed in claim 13, wherein a second leg is mounted on the axle tube opposite the first leg and is pivotably about a second pivot axis, wherein the first leg and the second leg are connected together by a transmission element, and wherein the transmission element transmits a pivot movement of at least one of the first leg and the second leg to the other of the at least one of the first leg and the second leg.

15. An axle unit for use in utility vehicles with at least one of a hydraulic and a compressed air system, comprising:
an axle tube; and
an actuation unit;
wherein the axle tube has a receiving opening;
wherein the actuation unit has a cylinder, a piston rod and a piston;
wherein the piston divides a chamber of the actuation unit into a first chamber region and a second chamber region;
wherein the piston rod is in engagement with the piston and is configured such that the piston rod can be brought into engagement with a leg of the axle unit to transmit a force to the leg;
wherein the actuation unit is arranged in the receiving opening of the axle tube and is secured against moving transversely relative to a tube axis and at least in one direction along the tube axis;
wherein a second leg is mounted on the axle tube opposite the first leg and is pivotably about a second pivot axis, wherein the first leg and the second leg are connected together by a transmission element, and wherein the transmission element transmits a pivot movement of at least one of the first leg and the second leg to the other of the at least one of the first leg and the second leg; and wherein a second actuation unit is configured to be mounted in a second receiving opening of the axle tube, and wherein the second actuation unit is configured to apply a force to the second leg along the tube axis in the opposite direction to the force which is applied to the first leg by the first actuation unit.

16. An axle unit for use in utility vehicles with at least one of a hydraulic and a compressed air system, comprising:
an axle tube; and
an actuation unit;
wherein the axle tube has a receiving opening;
wherein the actuation unit has a cylinder, a piston rod and a piston;
wherein the piston divides a chamber of the actuation unit into a first chamber region and a second chamber region;
wherein the piston rod is in engagement with the piston and is configured such that the piston rod can be brought into engagement with a leg of the axle unit to transmit a force to the leg;
wherein the actuation unit is arranged in the receiving opening of the axle tube and is secured against moving transversely relative to a tube axis and at least in one direction along the tube axis;
wherein the leg has a wheel axis, wherein a wheel of the utility vehicle is configured to be mounted on the leg so as to be rotatable about the wheel axis, and wherein the wheel axis is parallel to or co-linear with the tube axis when the leg is in the straight-ahead position;
wherein a second actuation unit is configured to be mounted in a second receiving opening of the axle tube, and wherein the second actuation unit is configured to apply a force to the second leg along the tube axis in the opposite direction to the force which is applied to the first leg by the first actuation unit; and
wherein the second actuation unit has a cylinder, a piston rod and a piston, wherein in a fault state or on reversing of the utility vehicle, the piston rods of the actuation units protrude from the cylinders of the actuation units with a blocking length, and wherein the legs are held in the straight-ahead position by the piston rods and the transmission element.

17. The axle unit as claimed in claim 16, wherein the blocking length is the maximally extended length of the piston rod.

18. The axle unit as claimed in claim 17, wherein the first chamber region is arranged on the side of the piston facing away from the piston rod, and wherein the introduction of pressurized fluid into the first chamber region causes a movement of the piston and the piston rod along the tube axis such that the piston rod comes into engagement with the leg and transmits an actuating force to the leg.

19. The axle unit as claimed in claim 18, wherein the pressurized fluid is stored in the storage tank which, even on failure of the hydraulic or compressed air system of the utility vehicle, provides sufficient fluid and pressure to move the piston rods of the actuation units such that the piston rods protrude out of the cylinders with a blocking length.

20. The axle unit as claimed claim 19, wherein the first chamber region is arranged on the side of the piston facing away from the piston rod, wherein a return means is arranged in the first chamber region and held under pretension by the piston, wherein in normal operation of the actuation unit, the at least one of the hydraulic system and the compressed air system of the utility vehicle provides pressurized fluid in the second chamber region, forcing the piston against the return means, and wherein on a pressure fall in the second chamber region, a return member presses the piston with the piston rod against the leg.

21. The axle unit as claimed in claim 20, wherein the return member comprises a metal spring element.

22. The axle unit as claimed in claim 21, wherein the piston rod is mounted on the leg such that the piston rod transmits a force to the leg in both directions along the tube axis.

23. The axle unit as claimed in claim 22, wherein the leg has an application face which is configured such that on application of a force by the piston rod, substantially no force components occur transversely to the tube axis.

24. The axle unit as claimed in claim 23, wherein the extension of the piston rod along the tube axis can be adjusted, and wherein in the state fully retracted into the cylinder, the piston rod is configured to limit a steering deflection for the leg.

25. An axle unit for use in utility vehicles with at least one of a hydraulic and a compressed air system, comprising:
an axle tube; and
an actuation unit;
wherein the axle tube has a receiving opening;
wherein the actuation unit has a cylinder, a piston rod and a piston;
wherein the piston divides a chamber of the actuation unit into a first chamber region and a second chamber region;
wherein the piston rod is in engagement with the piston and is configured such that the piston rod can be brought into engagement with a leg of the axle unit to transmit a force to the leg;
wherein the actuation unit is arranged in the receiving opening of the axle tube and is secured against moving transversely relative to a tube axis and at least in one direction along the tube axis; and
wherein the leg has an application face which is configured such that on application of a force by the piston rod, substantially no force components occur transversely to the tube axis.

* * * * *

UNITED STATES PATENT AND TRADEMARK OFFICE
CERTIFICATE OF CORRECTION

PATENT NO. : 10,654,521 B2
APPLICATION NO. : 15/561776
DATED : May 19, 2020
INVENTOR(S) : Christ Page 1 of 1

It is certified that error appears in the above-identified patent and that said Letters Patent is hereby corrected as shown below:

In the Claims

Column 11, Claim 5, Line 30:
"pivotably" should be — pivotable —

Column 11, Claim 7, Line 49:
"protrude" should be — protrudes —

Column 12, Claim 14, Line 39:
"pivotably" should be — pivotable —

Column 12, Claim 15, Line 64:
"pivotably" should be — pivotable —

Column 14, Claim 20, Line 7:
After "claimed" insert -- in --

Signed and Sealed this
Twenty-seventh Day of April, 2021

Drew Hirshfeld
*Performing the Functions and Duties of the
Under Secretary of Commerce for Intellectual Property and
Director of the United States Patent and Trademark Office*